United States Patent [19]

Conan

[11] Patent Number: 4,472,948
[45] Date of Patent: Sep. 25, 1984

[54] HEAT PUMP INSTALLATION OPERATING FROM A COLD SOURCE CONSTITUTED BY A TURBID OR CORROSIVE SOLUTION

[75] Inventor: Jean Conan, Kercradet en Saint Lyphard, France

[73] Assignee: Alsthom-Atlantique, Paris, France

[21] Appl. No.: 435,188

[22] Filed: Oct. 19, 1982

[30] Foreign Application Priority Data

Oct. 23, 1981 [FR] France ............................... 81 19923

[51] Int. Cl.³ ............................................. F25B 25/00
[52] U.S. Cl. ....................................... 62/332; 62/474; 62/526
[58] Field of Search ................. 62/332, 333, 335, 526, 62/324.1, 325, 98, 99, 474, 475, DIG. 20

[56] References Cited

U.S. PATENT DOCUMENTS

| 2,512,545 | 6/1950 | Hagard | 62/98 |
| 2,596,195 | 5/1952 | Arbuckle | 62/526 X |
| 3,091,098 | 5/1963 | Bowers | 62/180 |
| 3,234,109 | 2/1966 | Lustenader | 203/11 |
| 3,276,516 | 10/1966 | Japhet | 62/99 X |
| 3,869,351 | 3/1975 | Schwartzman | 202/172 |
| 3,906,742 | 9/1975 | Newton | 62/332 |
| 4,344,296 | 8/1982 | Staples | 62/333 |

FOREIGN PATENT DOCUMENTS 192 of 0000 European Pat. Off. .
5,825 of 0000 European Pat. Off. .

Primary Examiner—Lloyd L. King
Attorney, Agent, or Firm—Sughrue, Mion, Zinn, Macpeak, and Seas

[57] ABSTRACT

Heat pump installation operating from a cold source (A) formed of a turbid or corrosive solution, having at least one evaporator (4, 5, 6), a compressor (7), a condenser (8), a fluid cycle, with the condenser being cooled by a heating fluid, comprising expansion and evaporation means (1, 2, 3) at least partially from said solution of the cold source, and wherein the produced vapor is then directed toward the evaporator (4, 5, 6) where it condenses.

The invention is particularly useful for heating from calories in geothermic water.

4 Claims, 1 Drawing Figure

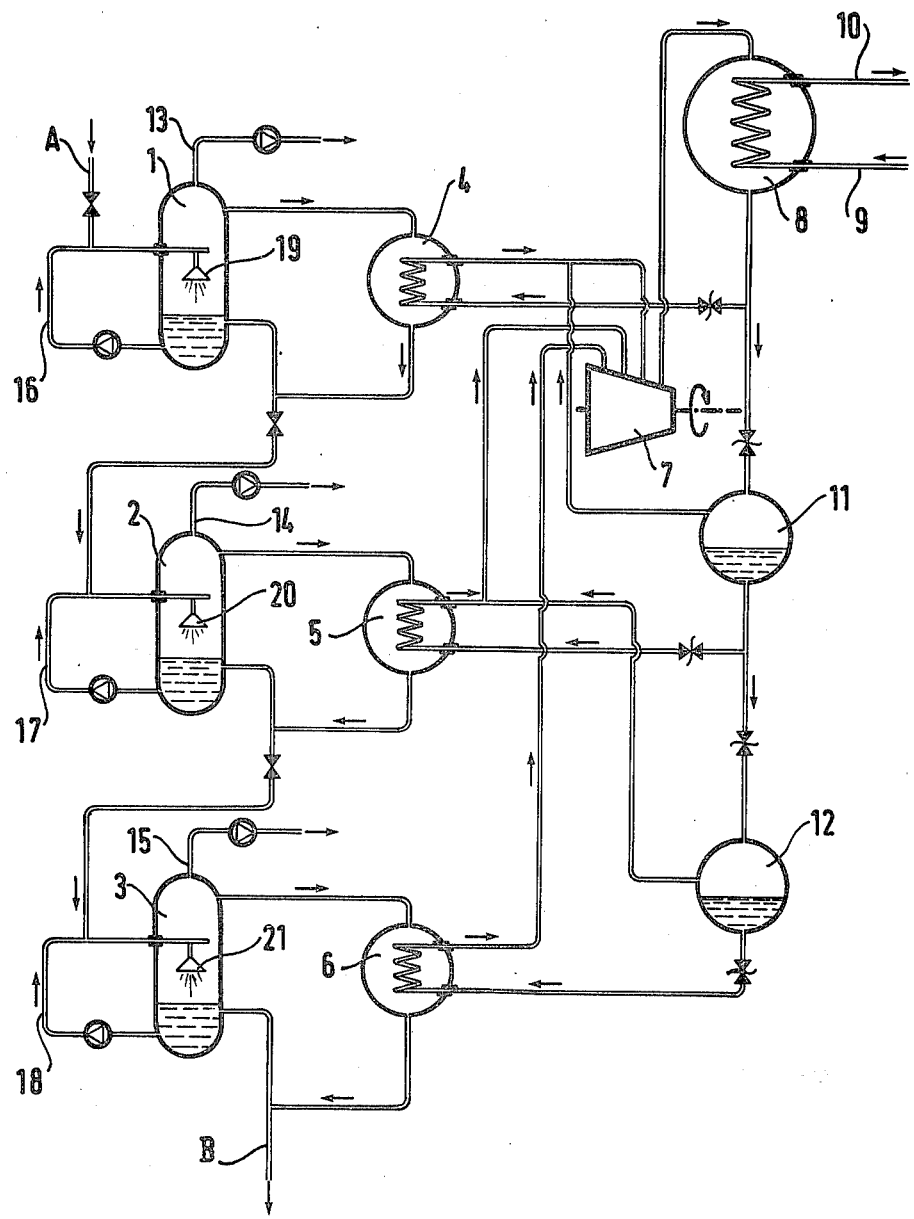

weiter
HEAT PUMP INSTALLATION OPERATING FROM A COLD SOURCE CONSTITUTED BY A TURBID OR CORROSIVE SOLUTION The present invention relates to a heat pump installation operating from a cold source formed of a turbid or corrosive solution.

TECHNICAL FIELD

Large quantities of calories are contained in different liquid industrial outflows which can be utilized in heating installations with a heat pump. However, such outflows appear often in the form of very viscuous solutions which are highly calcareous or contain aggressive substances, leading to low performance or to a deterioration of the evaporator of the heat pump. The same situation exists in case of geothermic water.

SUMMARY OF THE INVENTION

It is the object of the present invention to allow the utilization of such encrusting or corrosive liquids in heat pump systems while avoiding the encrusting or corrosion of the evaporator.

It is also an object of the invention to provide a heat pump installation which operates from a cold source formed of a turbid or corrosive solution, having at least one evaporator, a compressor, a condenser, a fluid cycle, with the condenser being cooled by a fluid to be heated, characterized in that it comprises expansion means, at least partially of said solution of the cold source, and in that the produced vapor is then directed toward the evaporator where it condenses.

BRIEF DESCRIPTION OF THE DRAWING

The invention is best understood by referring to an example of an embodiment described hereafter in connection with the attached drawing in which the single figure shows a schematic representation of a heat pump installation according to the invention.

BEST MODE OF CARRYING OUT THE INVENTION

The figure illustrates the case where cooling of an aqueous solution is required which contains substances causing a precipitate upon cooling. This solution is available at a temperature of 65° C. and which is intended to be returned to the soil or to a treatment system of outflows with a temperature of 10° C., by recuperating the calories for producing hot water at 75 ° C. by a heat pump.

According to the invention, the solution is expanded in three steps in the cold source expansion reservoirs 1, 2 and 3 and cooled by the operations of vaporization, partially freeing each time practically pure water vapor.

The formed water vapor is condensed at each pressure and temperature level on the cold surface of three evaporators 4, 5 and 6, connected to refrigerating compressor 7 with three stages of compression. The condensate of water vapor, recuperated at the lower portion of each evaporator 4, 5, 6, is mixed with the solution coming from the cold source expansion reservoirs 1, 2 and 3. The result is that the discharged output of the cooled solution is exactly the same as the one of the hot solution arriving at A at the beginning, with the exception of the difference in precipitates according to the given case. This point is important in the case of utilization of geothermic water which must be returned to the ground after use.

The vapor of the refrigerating liquid, compressed by the compressor 7, is condensed in a condenser 8 in which water to be heated circulates which enters by a conduit 9 and leaves by a conduit 10. In the described example of an embodiment the installation is completed by two intermediate refrigeration cycle expansion reservoirs 11 and 12 of refrigerating liquid, directed toward the compressor 7 at a level of pressure corresponding to that at the output of the evaporator 4. Also, a portion of the refrigerating liquid which leaves the expansion reservoir 11 is directed toward the evaporator 5, and another portion toward the expansion reservoir 12 which produces vapor sent to the compressor 7 on the level of pressure corresponding to that at the output of the evaporator 5. The refrigerating liquid coming out of the reservoir 12 feeds the evapoorator 6.

The hot solution, entering at A at 65° C. leaves the expansion reservoir 3 at 10° C.

The cold source expansion reservoirs 1, 2 and 3 each comprise an output conduit 13, 14 and 15, respectively, for gas which cannot be condensed. Each cold source expansion reservoir 1, 2 and 3 comprises a recirculation conduit 16, 17 and 18, respectively, recycling a portion of the condensate toward the respective elements of pulverization 19, 20 and 21.

The installation is completed by a unit of pump valves which are not referenced.

To give an idea, the following numerical example can be stated. The hot solution arrives at A at 65° C. and is cooled to 46° C. in the cold source expansion reservoir 1 where the pressure is 0.1042 bar, it is cooled to 28° C. in the cold source expansion reservoir 2 where the pressure is 0.039 bar, and it is finally cooled to 10° C. in the cold source expansion reservoir 3 where the pressure is 0.0127 bar.

The refrigerating fluid is at 77.5° C. in the condenser 8 with a pressure of 22.6 bar; in the evaporator 4 the refrigerating fluid is at 40° C. under 9.9 bar, in the evaporator 5 it is at 22° C. under 6.192 bar, and in the evaporator 6 it is at 4° C. under 3.628 bar.

The water to be heated enters the condenser 8 at 55° C., for example, and leaves there at 75° C.

A particularly interesting application of the invention lies in the field of heating where the caloric contents of geothermic water at any temperature is exploited while avoiding the use of large quantities of special and costly materials.

I claim:

1. Heat pump installation operating from a cold source constituted by a highly calcareous turbid or corrosive hot solution which by vaporization under expansion partially frees pure water vapor, said heat pump installation comprising a closed refrigeration fluid cycle, having in order, at least one evaporator, a compressor, a condenser, and conduit means carrying a vaporizable refrigerant connecting said at least one evaporator, compressor and condenser in series, means for supplying a heating fluid to said condenser for removing useful heat from said refrigeration cycle, the improvement comprising:

at least one cold source expansion reservoir, means for supplying said turbid or corrosive hot solution to said at least one cold source expansion reservoir for expansion therein to purify any cold source vapor created therein by pressure reduction;

whereby, as a result of pressure reduction, partially free pure water vapor is released by vaporization thereof from said turbid or corrosive solution, and means for supplying only said pure water vapor produced at said at least one cold source expansion reservoir to said at least one evaporator for condensing therein without contamination of the evaporator and for vaporizing the refrigerant within said closed refrigeration fluid cycle at said at least one evaporator.

2. Heat pump installation according to claim 1, wherein said at least one cold source expansion reservoir comprises at least two cold source expansion reservoirs connected in series, wherein said at least one evaporator comprises at least two evaporators, and wherein said means for supplying the pure water vapor produced at said at least one cold source expansion reservoir from said turbid or corrosive hot solution comprises means for feeding pure water vapor separately from said at least two cold source expansion reservoirs to respective ones of said at least two evaporators.

3. Heat pump installation according to claim 2, wherein means are provided for connecting the evaporator other than the last evaporator in the series to the downstream following cold source expansion reservoir to return condensed pure water vapor from said evaporator to said downstream following cold source expansion reservoir along with the non-vaporized turbid or corrosive hot solution passing in series from one cold source expansion reservoir to the other for expansion therein.

4. Heat pump installation according to claim 2, wherein said compressor comprises at least two stages, and wherein said installation comprises means for supplying the refrigerant from said closed refrigeration fluid cycle from said evaporators to said compressor stages, respectively, as a function of the compressor stage fluid pressure.

* * * * *